UNITED STATES PATENT OFFICE.

JAMES DUFF, OF OSWEGO, NEW YORK.

METHOD OF OBTAINING DEXTRINE AND SACCHARINE MATTER FROM GRAINS.

SPECIFICATION forming part of Letters Patent No. 260,853, dated July 11, 1882.

Application filed February 27, 1882. (No specimens.)

*To all whom it may concern:*

Be it known that I, JAMES DUFF, of Oswego, in the county of Oswego and State of New York, have invented certain new and useful Improvements in Methods of Obtaining Dextrine and Saccharine Matter from Grains, of which the following is a specification.

My invention relates to the production of dextrine and saccharine matter from corn and other grain, and in such production to utilize all of the starch-yielding portions of the grain, and to obtain a larger yield. As ordinarily ground, the meal leaves the mill in particles of varying size, some being very fine and others quite coarse.

In the manufacture of dextrine and saccharine matter from grains, from the fact that there is a variance in the size of the particles of the ground meal, it follows that in the process of conversion or saccharification a large quantity of valuable matter is lost, because the converting agent cannot properly act upon the starchy portions of these larger pieces while it is fully converting the finer ones. That such is the case can be demonstrated by a test being applied to the waste from a distillery, in which will be found a large per cent. of the starch which has escaped the action of the converting agent. To save this loss of starch and thereby increase the yield is the object of my invention.

My invention consists of the following hereinafter-described steps in combination: first, grinding the grain in the customary manner; second, passing the meal into the mash-tub with water, and there mashing and converting the mass with malt or any saccharifying agent; third, passing the whole of the contents of the mash-tub after a transformation has been effected to the extent usually practiced and regrinding it for the complete reduction of the mass which escaped previous conversion because of the size of the particles, and which by the regrinding and liberation is exposed to such action for the first time; fourth, passing the reground mass onto or into a fine sieve to remove the hulls, &c., and washing it while being sifted; fifth, passing the liquor which passes through the sieve into a tub or vat, where the conversion is completed.

The grain may be ground, in the usual manner, in any ordinary mill and the meal fed into a common mash or converting tub direct, or into a storage-bin, and from that into the mash-tub, where the whole mass is heated or cooked in the ordinary way and treated with malt or any saccharifying agent in the usual manner, and thoroughly agitated during the heating or cooking and while it is being acted upon by the malt or saccharifying agent. After the operation of mashing and saccharification is completed as far as is customary, or the first transformation only of the then liberated starch effected, without in any manner arresting the process of transformation or conversion, but for the purpose of facilitating its completion, I pass the whole mass of water, meal, hulls, &c., and malt or converting agent into and through a second mill or reducing agent, in order that such portion of the mass which is not properly reduced may be reduced to a sufficient degree and the starchy matter contained therein be released, brought to light, and afterward converted, it being a fact that the starchy matter contained in the larger particles cannot be wholly converted without the secondary grinding and reduction. From the second mill the reground mass flows onto or into a sieve or separator agitated or revolved in the usual way, which is of such mesh as to practically separate the hulls from the mass, if it is desired to separate them. While being so sifted it can be sprinkled and washed plentifully with water by any ordinary devices to wash from the hulls the starch or saccharified or converted matter.

Beneath the sieve or separator is a trough or box with hopper-shaped bottom, which receives the fine matter and water which pass through the meshes and conducts them into another tub or vat, while the tailings pass off over the end of the sieve as feed or waste; or the mass as it leaves the mash-tub may pass through or over one or more sieves or separators of fine mesh, which are agitated or rotated as usual, and pass through the meshes that part which is sufficiently reduced, and what is retained passes into the second mill and is reground, and then again sifted and the hulls removed, as before described, and the liquor conducted into the second tub. During each sifting the tailings in the secondary sieve should be washed. In this second tub the mashing and converting is continued to completion, or until a transformation or a saccharification of all, or practically all, of the liberated starch is effected, which can be ascertained by a proper test being made. During the secondary grinding and subsequent treatment it is advisable to keep the liquid covered to retain the heat and prevent too much exposure of the mass to the air and consequent evaporation and cooling, it being necessary to maintain the heat in order that the converting or saccharifying agent may fully act; it being the aim in the manufacture of saccharine matter not to arrest the process of conversion until completion. The second tub is provided with heating and cooling devices similar to those in the common mash-tub or converting-tub.

If it is desired to produce spirits or other product of fermentation, the saccharine liquor so obtained is properly treated for that purpose; or the saccharine liquor may be converted into glucose, grape-sugar, or sirup by treating it in the customary manner. If it is desired to produce dextrine, the conversion of the starchy matter can be continued in the tubs and stopped at the proper point, and the dextrine liquor filtered and concentrated and dried, or partially dried, so as to produce the commercial dextrine. I can also take the contents of a mash-tub put through, or partially through, the ordinary process now in use for the purpose of producing spirits or other product of fermentation and regrind and reduce the mass, as above described, sifting it, if necessary, for the purpose of increasing the yield of the desired product.

In operations of distilling the presence of unreduced matter is objectionable for the reason that part of the finely-reduced matter is more quickly acted upon by the malt and reaches a stage of fermentation in advance of the coarser starchy matter, part of the material under treatment thus reaching the acetous stage before the whole has undergone the vinous. By my process, however, this difficulty is avoided, as by equally and finely reducing the whole mass by regrinding practically all of the starch is set free and the whole mass equally acted on by the diastase. In some cases it may not be advisable to remove the hulls, in which case the secondary sieve or separator, or those designed for the removal of the hulls, may be dispensed with. The saccharine liquor so produced can be filtered in the ordinary way if further cleansing and purification is desired. If the second grinding should not be resorted to, these coarser parts of the meal and the hull may be separated, which latter is objectionable because of an undesirable flavor imparted by its presence.

What I claim as my invention, and desire to secure by Letters Patent, is—

1. The method, substantially as herein described, of treating grain for the purpose of obtaining dextrine and saccharine matter, which consists of the following steps in combination: first, grinding the grain and passing the meal into the mash-tub and mashing and converting the mass with malt or saccharifying agent; second, passing the contents of the mash or converting tub into a second mill and regrinding it without arresting the conversion or transformation to liberate the unconverted starchy matter; third, separating the hulls, &c., from the saccharine liquor; fourth, passing the liquor into a tub or vat, where the conversion of the remaining unconverted starchy matter is completed.

2. The process, substantially as above described, of regrinding the contents of the mash-tub after the usual operation of grinding and mashing with malt or other saccharifying agent or saccharification, or after the first transformation of the freed starch is completed, for the purposes set forth.

3. In the process of producing dextrine and saccharine matter from grains, the sieving or separating of the contents of the mash-tub after cooking and full or partial conversion, and the regrinding of the unreduced starchy matter, substantially as and for the purposes set forth.

4. In the process of producing dextrine and saccharine matter from grains, the separation of the hulls and other objectionable matter from the mass after it has been cooked, fully or partially converted, and reground, substantially as described.

5. In the process of producing dextrine and saccharine matter from grain, after preliminary grinding in the dry state, the separation of the hulls and other objectionable matter from the mass by screening after cooking and full or partial conversion, substantially as described, to avoid the injurious effects caused by its presence.

In witness whereof I have hereunto set my hand this 17th day of February, 1882.

JAMES DUFF.

Witnesses:
C. W. SMITH,
J. A. NOTTINGHAM.